(12) United States Patent
Yoshimoto et al.

(10) Patent No.: US 9,353,803 B2
(45) Date of Patent: May 31, 2016

(54) POWER TRANSMITTING APPARATUS

(71) Applicant: KABUSHIKI KAISHA F.C.C., Hamamatsu-shi, Shizuoka (JP)

(72) Inventors: Katsu Yoshimoto, Hamamatsu (JP); Han Hiong Chen, Hamamatsu (JP); Akira Kosaka, Hamamatsu (JP)

(73) Assignee: KABUSHIKI KAISHA F.C.C., Hamamatsu-shi (JP)

( * ) Notice: Subject to any disclaimer, the term of this patent is extended or adjusted under 35 U.S.C. 154(b) by 0 days.

(21) Appl. No.: 14/487,501

(22) Filed: Sep. 16, 2014

(65) Prior Publication Data

US 2015/0001028 A1    Jan. 1, 2015

Related U.S. Application Data

(63) Continuation of application No. PCT/JP2013/057274, filed on Mar. 14, 2013.

(30) Foreign Application Priority Data

Mar. 16, 2012    (JP) ................................. 2012-061223

(51) Int. Cl.
*F16D 13/42*    (2006.01)
*F16D 13/52*    (2006.01)
*F16D 13/56*    (2006.01)

(52) U.S. Cl.
CPC ................ *F16D 13/52* (2013.01); *F16D 13/56* (2013.01); *F16D 2013/565* (2013.01)

(58) Field of Classification Search
None
See application file for complete search history.

(56) References Cited

U.S. PATENT DOCUMENTS

| 2011/0073432 A1* | 3/2011 | Gokan | F16D 13/56 192/70.12 |
| 2013/0025997 A1* | 1/2013 | Kataoka | F16D 13/56 192/70.23 |

FOREIGN PATENT DOCUMENTS

| JP | S61-096222 | 5/1986 |
| JP | S61-149618 | 7/1986 |
| JP | 2011-153655 | 8/2011 |

OTHER PUBLICATIONS

International Search Report for International Application No. PCT/JP2013/057274, dated Apr. 9, 2013, in 2 pages.

* cited by examiner

*Primary Examiner* — David J Hlavka
(74) *Attorney, Agent, or Firm* — Knobbe, Martens, Olson & Bear, LLP

(57) ABSTRACT

A power transmitting apparatus comprising a switching device for switching an urging device between an urging force applying position wherein an abutment between the other end of the urging device and the pressure member is kept to apply the urging force of urging device to the pressure member when the intermediate member is moved toward the pressure member, and an urging force cutting-off position wherein the other end of the urging device is separated from the pressure member to cut-off the urging force of urging device to the pressure member when the intermediate member is moved toward the pressure member. In some embodiments, the urging device is set at the urging force applying position while the intermediate member is stopped when the vehicle is stopped and the urging device is set at the urging force cutting-off position while the intermediate member is rotated when the vehicle is running.

16 Claims, 11 Drawing Sheets

POWER TRANSMITTING APPARATUS

INCORPORATION BY REFERENCE TO ANY PRIORITY APPLICATIONS

Any and all applications for which a foreign or domestic priority claim is identified in the Application Data Sheet as filed with the present application, or any corrections thereto, are hereby incorporated by reference under 37 CFR 1.57.

BACKGROUND OF THE INVENTIONS

1. Field of the Inventions

The present inventions relate to a power transmitting apparatus for arbitrarily transmitting or cutting-off the rotational driving power of an input member to or from an output member.

2. Description of the Related Art

In general the power transmission apparatus for a motorcycle is intended to arbitrarily perform transmission or cutting-off of the driving power of an engine to or from a transmission and a driving wheel and comprises an input member connected to an engine-side, an output member connected to a transmission and a driving wheel-side, and a clutch member connected to the output member. The driving power can be transmitted by press-contacting a plurality of driving-side clutch discs and driven-side clutch discs with each other or cut off by releasing the press-contacting force acting on the driving-side clutch discs and driven-side clutch discs.

More particularly, the power transmitting apparatus of the prior art comprises a clutch housing rotatable together with an input member and mounted thereon a plurality of driving-side clutch discs, a plurality of driven-side clutch discs arranged alternately between the driving-side clutch discs, a clutch member connected to an output member, a pressure member mounted on the clutch member axially movably relative to the clutch member for forcing the driving-side clutch discs and the driven-side clutch discs to be press-contacted with each other and to release the press-contacting force acting on them in accordance with axial movement relative to the clutch member, and an intermediate member spline-fitted thereon with the driven-side clutch discs, and is constructed so as to transmit or cut-off the driving power inputted to the input member to or from the output member by press-contacting the driving-side clutch discs and the driven-side clutch discs with each other or releasing a press-contacting force acting on them.

Heretofore a power transmitting apparatus has been proposed provided with a back-torque limiting cam comprising a clutch member-side cam surface formed on the clutch member and an intermediate member-side cam surface formed on the intermediate member for performing a cam action so that the pressure member and the intermediate member are axially moved to release the press-contacting force acting on the driving-side clutch discs and the driven-side clutch discs when the rotational speed of the output member exceeds the rotational speed of the input member and a relative rotation is caused between the intermediate member and the clutch member (see, e.g., Japanese Patent Application JP 2011-153655 A).

SUMMARY OF THE INVENTIONS

In some cases, when a vehicle such as a motorcycle requires a so-called "pushing-start of engine" which is performed by pushing the vehicle to rotate wheels and start the engine, the back-torque limiting cam can be sometimes actuated, thereby reducing pressure on the clutch discs and reducing the transmission of power from the wheels to the engine, and thus can be difficult to smoothly start the engine.

Although it is conceivable to provide a locking mechanism formed of a swing pin for connecting the intermediate member and the clutch member during performing the pushing start of engine and for releasing the connection of the intermediate member and the clutch member when being swung by a centrifugal force after having performed the pushing-start of engine, difficulties can arise in that the swing pin forming the locking mechanism can resist against the torque transmitted from wheels to the engine during the pushing start of engine.

It is, therefore, an object of at least some of the inventions disclosed herein to provide a power transmitting apparatus which can transmit a torque necessary for performing the pushing start of engine and also can sufficiently resist the torque to be transmitted to the engine during pushing start of engine.

In some embodiments, there is provided a power transmitting apparatus for transmitting or cutting-off the rotational driving power of an input member to or from an output member by press-contacting or releasing the press-contacting force between driving-side clutch discs and driven-side clutch discs. The power transmitting apparatus can comprise: a clutch housing rotatable together with the input member and mounted thereon a plurality of the driving-side clutch discs; a plurality of the driven-side clutch discs arranged between the driving-side clutch discs of the clutch housing alternately therewith; a clutch member connected to the output member; a pressure member mounted on the clutch member and axially movably relative to the clutch member so that the driving-side clutch discs and the driven-side clutch discs are forced to be press-contacted each other and the press-contacting force acting on them is released in accordance with axial approach and separation of the pressure member relative to the clutch member; an intermediate member spline-fitted thereon with the driven-side clutch discs and arranged between the clutch member and the pressure member so as to be rotated together with them; a plurality of urging devices (e.g., urging means), one end of each urging device being mounted on a supporting member secured on bosses projected from the clutch member and the other end of each urging device being mounted on the pressure member for normally urging the pressure member toward the intermediate member and the clutch member in order to press-contact the driving-side clutch discs and the driven-side clutch discs each other; and a back-torque limiting cam comprising a clutch member-side cam surface formed on the clutch member and an intermediate member-side cam surface formed on the intermediate member for performing a cam action so that the intermediate member is axially moved to release the press-contacting force acting on the driving-side clutch discs and the driven-side clutch discs when the rotational speed of the output member exceeds the rotational speed of the input member and a relative rotation is caused between the intermediate member and the clutch member. In some embodiments, the power transmitting apparatus comprises a switching device (e.g., switching means) for switching the urging device between an urging force applying position and an urging force cutting-off position: wherein, in the urging force applying position an abutment between the other end of the urging device and the pressure member is kept to apply the urging force of urging device to the pressure member when the intermediate member is moved toward the pressure member by the cam action of the back-torque limiting cam, and wherein, in the urging force cutting-off position, the other end of the urging device is separated from the pressure member to cut-off the urging force of urging device to the pressure member when the intermediate member is moved toward the pressure member by the cam action of the back-torque limiting cam device; and that the urging device is set at the urging force applying position while the intermediate member is stopped when the vehicle is in a stopped condition and the urging device is set at the urging force cutting-off position while the intermediate member is rotated when the vehicle is in a running condition.

In some embodiments, the switching device is disposed on the intermediate member under a normally urged condition toward the urging force applying position and is adapted to be moved and switched to the urging force cutting-off position by a centrifugal force caused by rotation of the intermediate member.

In some embodiments, the switching device comprises a piece member slidable between the urging force applying position and the urging force cutting-off position, wherein the piece member has a surface with recessed portions in which the end of the urging device is fitted when the urging device is in the urging force applying position and abutment portions against which the end of the urging device is abutted when the urging device is in the urging force cutting-off position.

In some embodiments, the power transmitting apparatus includes both the switching device as well as a cutting-off device (e.g., cutting-off means) for cutting-off an urging force applied to the pressure member from a specific urging device of the plurality of the urging device by separating the other end of the specific urging device from the pressure member when the intermediate member is moved toward the pressure member by the cam action of the back-torque limiting cam, and wherein the switching device is arranged on any other urging device except for the specific urging device of the plurality of the urging device from which the urging force is cut-off by the cutting-off device.

In some embodiments, since the power transmitting apparatus comprises a switching device for switching the urging device between an urging force applying position and an urging force cutting-off position wherein, in the urging force applying position an abutment between the other end of the urging device and the pressure member is kept to apply the urging force of urging device to the pressure member when the intermediate member is moved toward the pressure member by the cam action of the back-torque limiting cam, and wherein, in the urging force cutting-off position the other end of the urging device is separated from the pressure member to cut-off the urging force of urging device to the pressure member when the intermediate member is moved toward the pressure member by the cam action of the back-torque limiting cam; and the urging device is set at the urging force applying position while the intermediate member is stopped when the vehicle is in a stopped condition and the urging device is set at the urging force cutting-off position while the intermediate member is rotated when the vehicle is in a running condition, it is possible to provide a power transmitting apparatus which can transmit a torque necessary for performing the pushing start of engine and also can sufficiently resist the torque to be transmitted to the engine.

In some embodiments, since the switching device is disposed on the intermediate member under a normally urged condition toward the urging force applying position and adapted to be moved and switched to the urging force cutting-off position by a centrifugal force caused by rotation of the intermediate member, it is possible to simplify the structure of the power transmitting apparatus through elimination of any other mechanism for performing switching operation of the switching device.

In some embodiments, since the switching device comprises a piece member slidable between the urging force applying position and the urging force cutting-off position, and the piece member has a surface with recessed portions in which the end of the urging device is fitted when the urging device is in the urging force applying position and abutment portions against which the end of the urging device is abutted when the urging device is in the urging force cutting-off position, it is possible to more smoothly transmit a necessary torque to an engine during the pushing start of the engine.

In some embodiments, since the power transmitting apparatus includes both the switching device as well as a cutting-off device for cutting-off an urging force applied to the pressure member from a specific urging device of the plurality of the urging devices by separating the other end of the specific urging device from the pressure member when the intermediate member is moved toward the pressure member by the cam action of the back-torque limiting cam, and the switching device is arranged on any other urging device except for the specific urging device of a plurality of the urging device from which the urging force is cut-off by the cutting-off device, it is possible to arbitrarily adjust the torque to be transmitted to an engine during the pushing start of engine and to set a torque during the pushing start of engine in accordance with various kinds of vehicles.

DETAILED DESCRIPTION OF THE PREFERRED EMBODIMENTS

Figure 1:
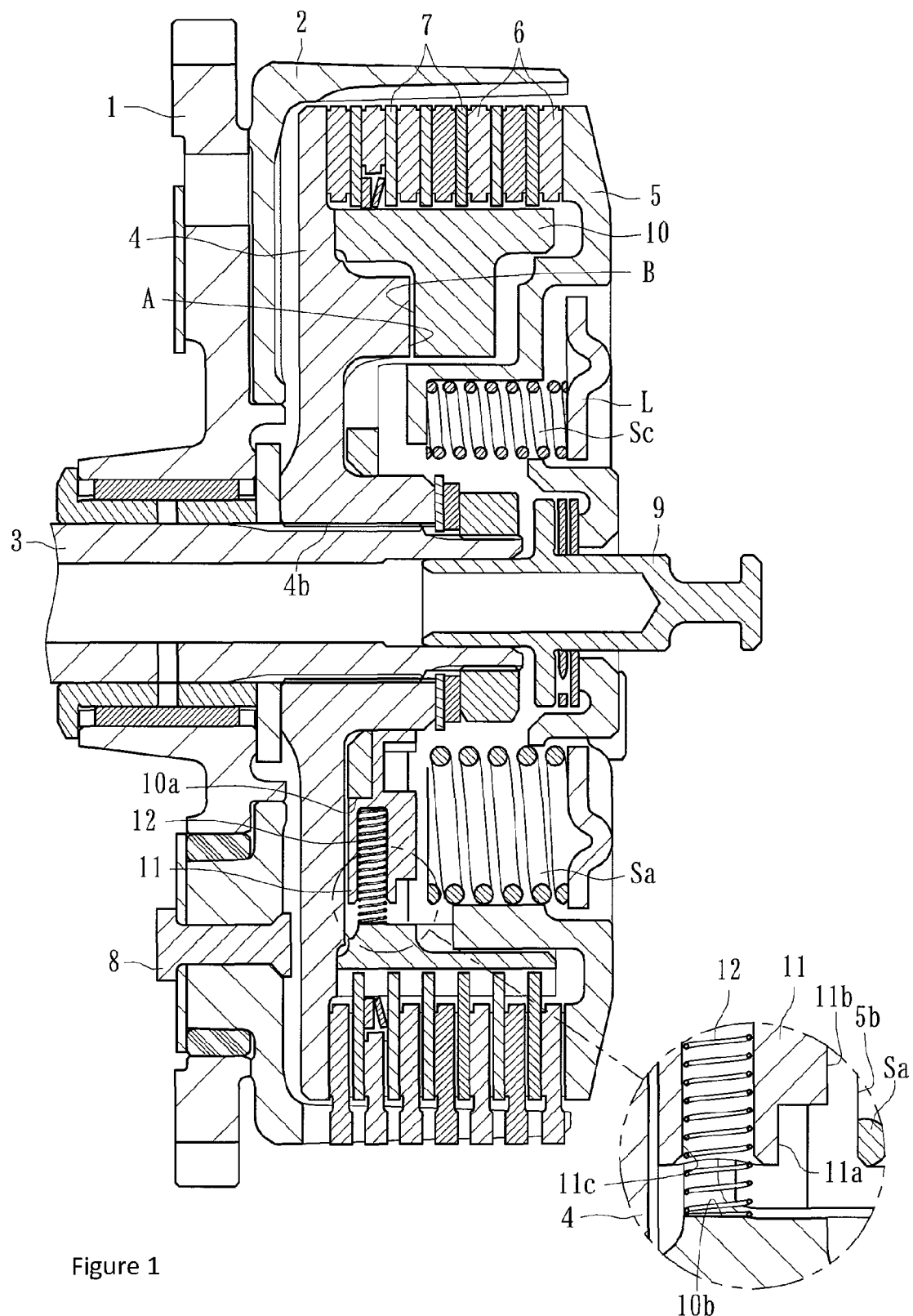
FIG. 1 is a whole longitudinal sectional view of a power transmitting apparatus of one embodiment of the present inventions.

Preferred embodiments of the present inventions will be hereinafter described with reference to the accompanying drawings.

A power transmitting apparatus of an embodiment of the present inventions is mounted on a vehicle such as a motorcycle to arbitrarily transmit or cut off the driving power of an engine to or from a transmission or driving wheel. As shown in FIGS. 1-7, the power transmitting apparatus can comprise a clutch housing 2 on which a gear 1 as an input member is mounted, a clutch member 4 connected to a shaft 3 as an output member, a pressure member 5 arranged at the right-hand of the clutch member 4 (e.g., from the perspective of FIG. 1), an intermediate member 10 arranged between the clutch member 4 and the pressure member 5, driving-side clutch discs 6 mounted on the clutch housing 2, driven-side clutch discs 7 mounted on the intermediate member 10, clutch springs Sa, Sb as an urging device (e.g., an urging means), a back-torque limiting cam (e.g., a clutch member-side cam surface A and an intermediate member-side cam surface B) which can serve as a back-torque limiting means, a piece member/switching device (e.g., switching means) 11, and a cutting-off device (e.g., a cutting-off means) 13.

The gear 1 can be rotated around the shaft 3 by the driving power (e.g., rotational power) transmitted from the engine and connected to the clutch housing 2 via rivets 8 etc. The clutch housing 2 can be formed as a cylindrical casing opened at its right-hand end (e.g., as seen in FIG. 1) and a plurality of driving-side clutch discs 6 can be mounted on the inner circumference of the clutch housing 2. Each of the driving-side clutch discs 6 can comprise a substantially annular plate and can be adapted to be rotated together with the clutch housing 2 and axially slidable (e.g., in the left-hand and right-hand directions seen in FIG. 1) therealong.

Figure 2:
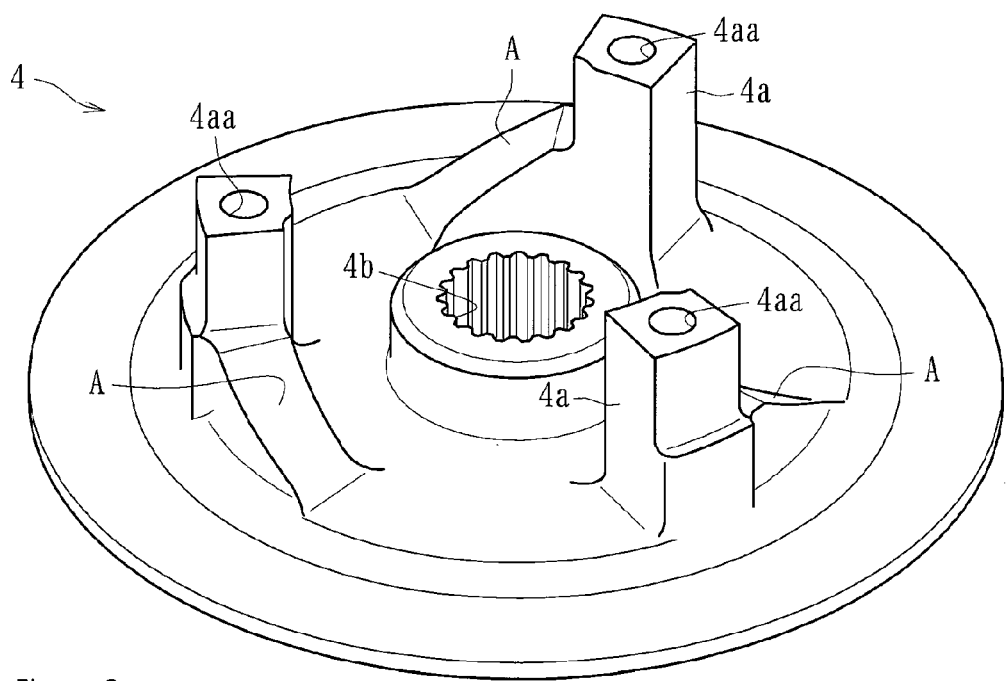
FIG. 2 is a perspective view showing a clutch member of the power transmitting apparatus of FIG. 1.

As shown in FIGS. 1 and 2, the clutch member 4 can be arranged within the clutch housing 2 and can be formed with a splined bore 4b in its center for receiving a splined end of the shaft 3. This can enable the shaft 3 to be rotated together with the clutch member 4. A plurality (e.g., three in this embodiment) of clutch member-side cam surfaces A can be formed on a surface of the clutch member 4 facing the intermediate member 10 at a predetermined distance on a same circle.

A reference numeral 4a in FIG. 2 denotes bosses projected from the clutch member 4 toward the pressure member 5 for mounting thereon a supporting member (e.g., a stay) L. The supporting member L can be mounted on the bosses by bolts b (see, e.g., FIGS. 8-11) screwed into bolt apertures 4aa formed on the projected ends of bosses 4a. The clutch springs Sa, Sb and springs s (see, e.g., FIG. 7) can be mounted between the supporting member L and the pressure member 5.

Figure 4:
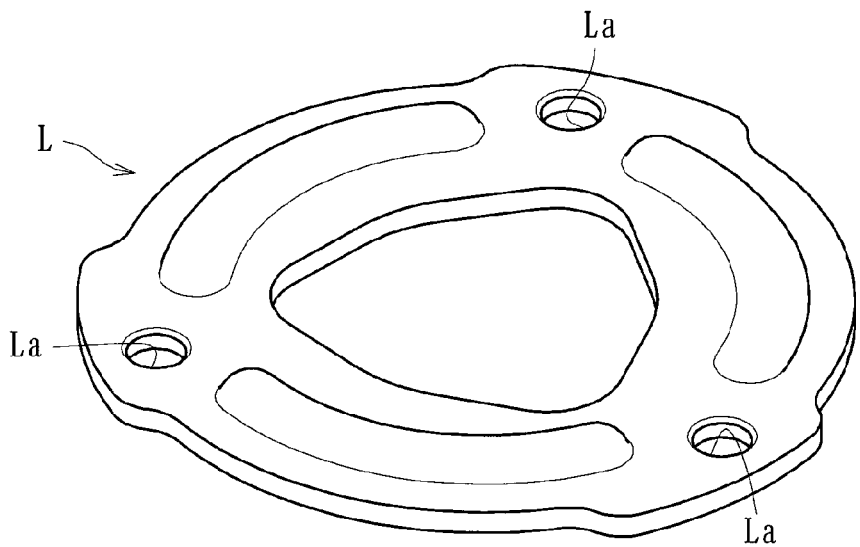
FIG. 4 is a perspective view showing a supporting member (e.g., stay) of the power transmitting apparatus of FIG. 1.

As shown in FIG. 4, the supporting member (e.g., stay) L can be formed of an annular metallic member and can be formed with apertures La for passages of bolts b at positions corresponding to the bolt apertures 4aa. One end of each of the clutch springs Sa, Sb and spring s are secured on the supporting member L.

The clutch springs Sa, Sb can comprise a plurality of coil springs and one end (e.g., the right-hand ends in FIG. 1) of each of them can be mounted on the supporting member L and the other end (e.g., the left-hand ends in FIG. 1) of each of them can be mounted on the pressure member 5 to normally urge the pressure member 5 toward the intermediate member 10 and clutch member 4 in order to press-contact the driving-side clutch discs 6 and the driven-side clutch discs 7 with each other.

In this specification, the clutch spring (e.g., the one in this embodiment) corresponding to the piece member (e.g., the switching device) 11 is denoted by a reference character Sa and the clutch springs (e.g., two in this embodiment) corresponding to the cutting-off devices 13 are denoted by a reference character Sb and named as "specific urging devices" (e.g., "specific urging means"). Both the clutch springs Sa, Sb act to normally urge the pressure member 5 towards the intermediate member 10 and the clutch member 4 (e.g., toward the left-hand in FIG. 1) to press-contact the driving-side clutch discs 6 and the driven-side clutch discs 7 with each other.

In addition, similarly to the clutch springs Sa, Sb, a reference character Sc denotes coil springs acting to normally urge the pressure member 5 towards the intermediate member 10 and the clutch member 4 (e.g., toward the left-hand in FIG. 1) to press-contact the driving-side clutch discs 6 and the driven-side clutch discs 7 with each other. However, the coil springs Sc do not have any correspondence to the cutting-off devices 13 and the piece member 11 (e.g., switching device). On the other hand, coil springs s act to push and hold the intermediate member 10.

Figure 3:
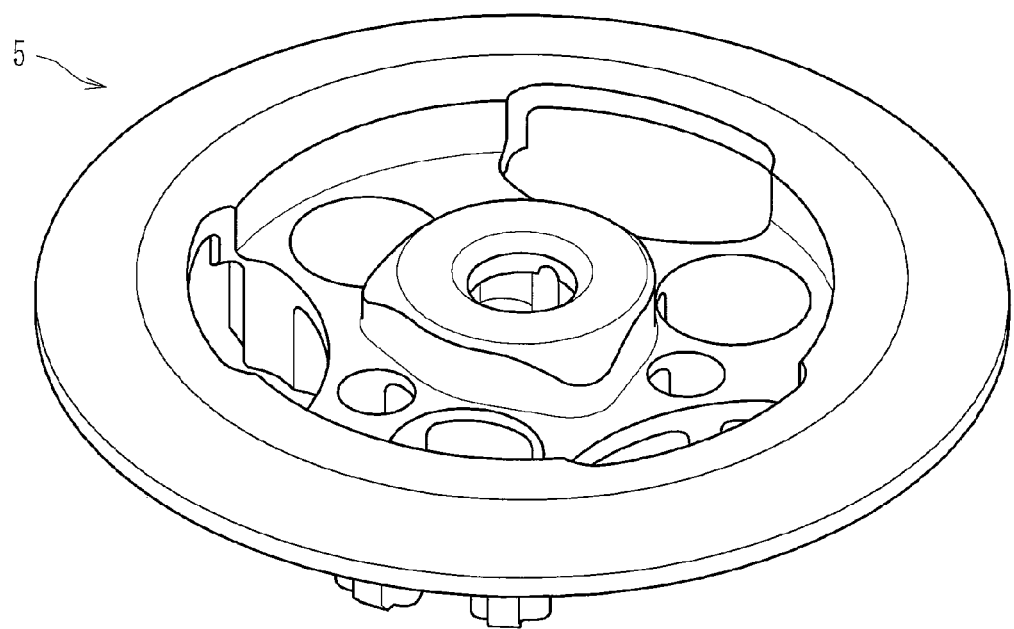
FIG. 3 is a perspective view showing a pressure member of the power transmitting apparatus of FIG. 1.

As shown in FIGS. 1 and 3, the pressure member 5 can be formed of a substantially disc-shaped member and mounted on the right-hand end (e.g., with reference to FIG. 1) of the clutch member 4 through the intermediate member 10. The pressure member 5 is normally urged toward the left-hand direction (e.g., with reference to FIG. 1) by the clutch springs Sa, Sb and can perform press-contact and release (e.g., separation) of the driving-side clutch discs 6 and the driven-side clutch discs 7 with and from each other. For example, the driving-side clutch discs 6 and the driven-side clutch discs 7 can be press-contacted each other when the pressure member 5 is moved toward the clutch member 4 and on the contrary the press-contacting force can be released when the pressure member 5 is moved away from the clutch member 4.

Figure 5:
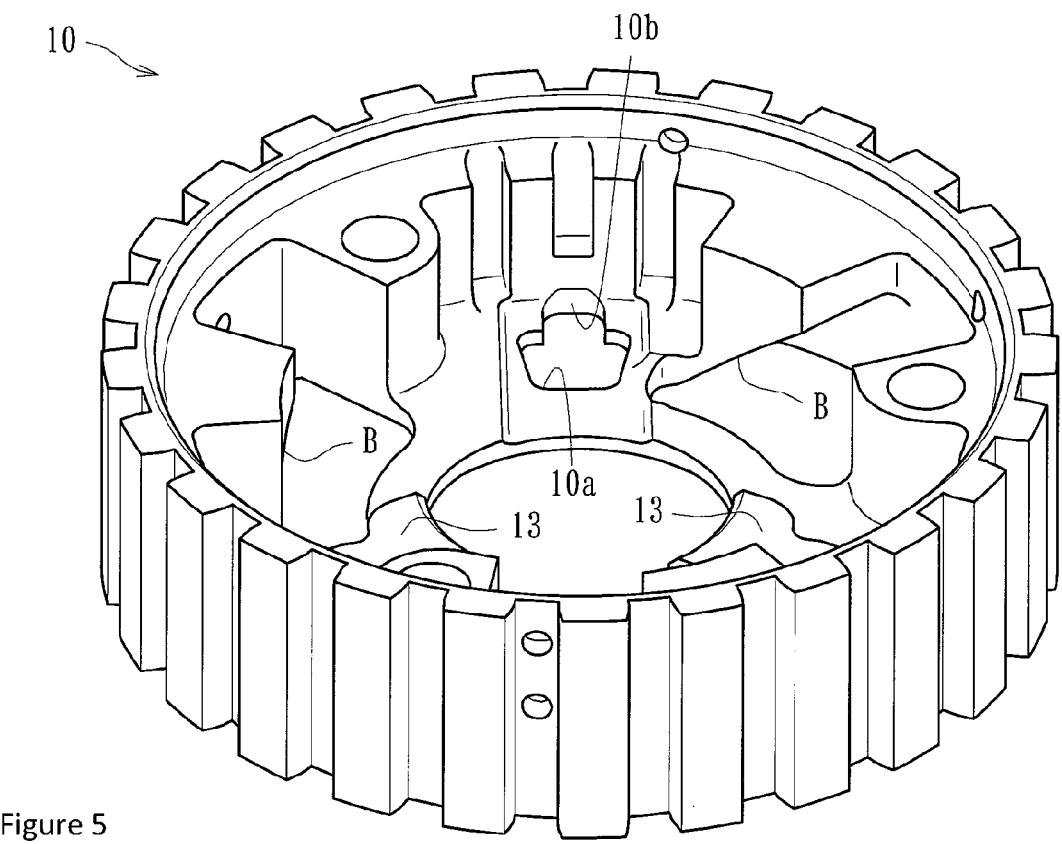
FIG. 5 is a perspective view showing an intermediate member of the power transmitting apparatus of FIG. 1.

As shown in FIG. 5, the intermediate member 10 can be formed on its outer circumference with spline grooves for engaging with the driven-side clutch discs 7 and can be arranged rotatable with and between the clutch member 4 and the pressure member 5. More particularly, the spline engagement of the intermediate member 10 and the driven-side clutch discs 7 enables axial movement of the driven-side clutch discs 7 but prevents rotation of them relative to the intermediate member 10. A plurality (e.g., three in this embodiment) of intermediate member-side cam surfaces b can be formed on the surface of the intermediate member 10 facing the cam surfaces A of the clutch member 4.

The driving-side clutch discs 6 and driven-side clutch discs 7 can be alternately arranged (e.g., interleaved with each other) to form a lamination and can be adapted to be press-contacted with each other and released from the press-contacting force. For example, both clutch discs 6, 7 can be allowed to be axially slid along the intermediate member 10 and press-contacted with each other when they are pressed toward the left-hand direction in FIG. 1 by the pressure member 5 so that the rotational driving force of the clutch housing 2 can be transmitted to the clutch member 4 and the shaft 3 via the intermediate member 10. On the contrary, when the pressing force of the pressure member 5 is released, the clutch member 4 cannot follow the rotation of the clutch housing 2 and accordingly the transmission of the rotational force to the shaft 3 is cut off.

In this specification, the term "separation" (e.g., release of press-contacting force) of the press-contacting force means a condition in which the clutch member 4 cannot follow the rotation of the clutch housing 2 (e.g. due to slippage between the clutch discs 6, 7) and thus does not necessarily mean a condition whether any clearance is caused between the clutch discs 6, 7.

The driving-side clutch disc 6 in the most right-hand position in FIG. 1 is normally contacted and pressed by the pressure member 5 with the urging force of the clutch springs Sa, Sb and thus both the clutch discs 6, 7 and accordingly the clutch housing 2 and the clutch member 4 are normally connected to rotate the shaft 3 when the driving power is inputted to the gear (e.g., input member) 1.

An axially extending operating member 9 can be disposed within a tip end (e.g., right-hand end of FIG. 1) of the shaft 3. The axially extending operating member 9 which can be moved toward the right-hand direction against the urging force of the clutch springs Sa, Sb with a driver of vehicle operating a clutch lever (not shown) so as to move the pressure member 5 toward the right-hand direction. The press-contacting force between the driving-side clutch discs 6 and the driven-side clutch discs 7 can be released by the movement of the pressure member 5 toward the right-hand direction to inhibit or prevent the transmission of the rotational driving power inputted to the gear 1 to the shaft 3.

The back-torque limiting cam can comprise a clutch member-side cam surface A formed on the clutch member 4 and an intermediate member-side cam surface b formed on the intermediate member 10 for performing a cam action so that the intermediate member 10 is axially (e.g., toward the right-hand direction in FIG. 1) moved to release the press-contacting force acting on the driving-side clutch discs 6 and the driven-side clutch discs 7 when the rotational speed of the shaft (e.g., output member) 3 exceeds the rotational speed of the clutch housing (e.g., input member) 2 and a relative rotation is caused between the intermediate member 10 and the clutch member 4.

Figure 12:
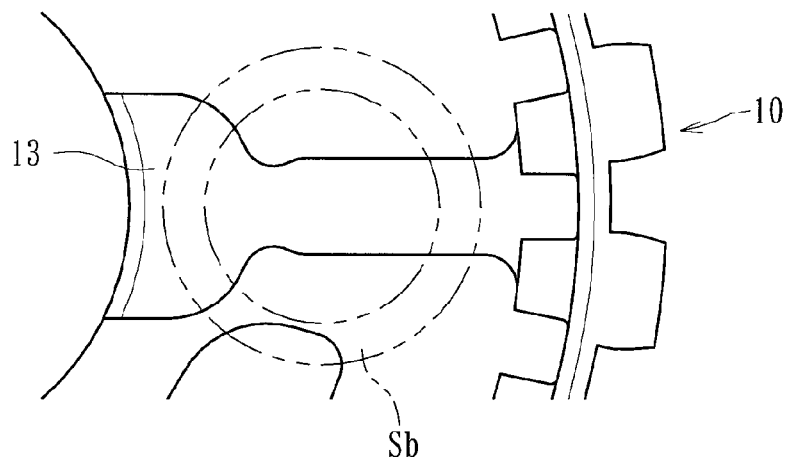
FIG. 12 is a plan view showing a cutting-off device of the power transmitting apparatus of FIG. 1.

As shown in FIGS. 5 and 12, a cutting-off device 13 comprises ribbed portions projected from the surface of the intermediate member 10 opposed to the pressure member 5 for cutting-off an urging force applied to the pressure member 5 from a specific urging device Sb of the plurality of urging devices Sa, Sb by separating the other end of the specific urging device Sb from the pressure member 5 when the intermediate member 10 is moved toward the pressure member 5 by the cam action of the back-torque limiting cam A, B.

Figure 13A:
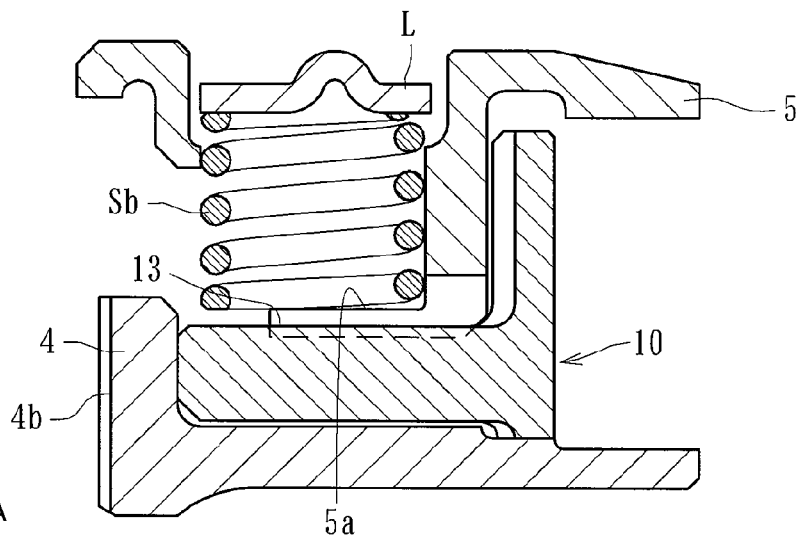
FIG. 13A is a longitudinal sectional schematic view showing an action of the cutting-off device in which the back-torque limiting cam device is not actuated.
Figure 13B:
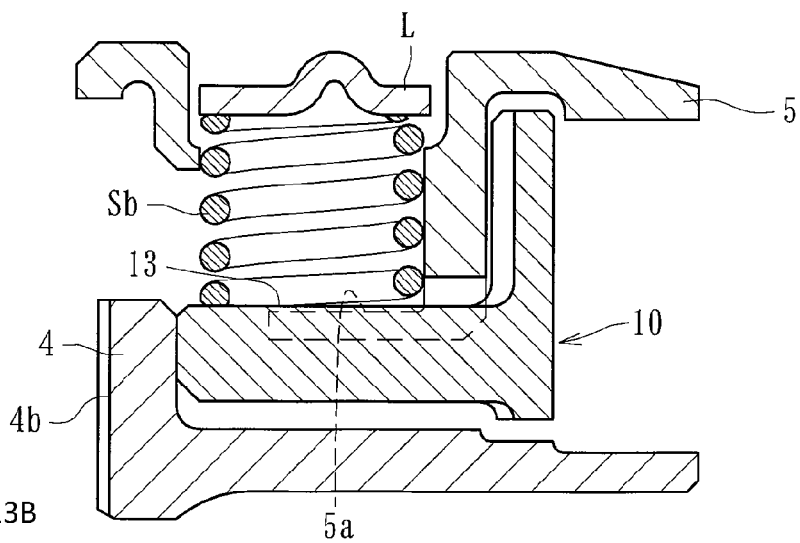
FIG. 13B is a longitudinal sectional schematic view showing an action of the cutting-off device in which the back-torque limiting cam device is actuated.

More particularly as shown in FIG. 13A, the specific clutch springs Sb are secured with one end being mounted on the supporting member (e.g., stay) L and the other end being mounted on a securing portion 5a of the pressure member 5. When the rotational speed of the shaft (e.g., output member) 3 exceeds the rotational speed of the clutch housing (e.g., input member) 2 and a relative rotation is caused between the intermediate member 10 and the clutch member 4 to move the intermediate member 10 toward the pressure member 5 during running of a vehicle, the cut-off devices 13 urge the other ends of the specific clutch springs Sb and separate the other end of the specific clutch springs Sb from the securing portion 5a of the pressure member 5 and cut off the urging force applied to the pressure member 5 from the specific clutch springs Sb.

Utilizing cutting-off devices 13 for cutting-off an urging force applied to the pressure member 5 from a specific urging devices Sb of the plurality of the urging devices Sa, Sb by separating the other end of the specific urging devices Sb from the pressure member 5 when the intermediate member 10 is moved toward the pressure member 5 by the cam action of the back-torque limiting cam A, B, can make it possible to reduce the urging force applied to the pressure member 5 by the urging devices (e.g., clutch springs Sa, Sb) without operating the pressure member 5. In some embodiments, it is possible to release the press-contacting force (e.g., to reduce the capacity of clutch torque) by reducing the press-contacting force between the driving-side clutch discs 6 and the driven-side clutch discs 7 and thus it is possible to improve the operability of clutch operation while surely avoiding instantaneous reciprocal operation of the pressure member 5 when the back-torque limiting cam is operated.

According to the present inventions, since the cutting-off device 13 is formed of ribbed portions projected from the surface of the intermediate member 10 facing to the pressure member 5 and enables the other ends of the specific urging devices (e.g., clutch springs Sb) to be separated from the pressure member 5 while being moved by the intermediate member 10 during the intermediate member 10 movement toward the pressure member 5 by action of the back-torque limiting cam, it can be possible to improve the operability of clutch operation by surely avoiding instantaneous reciprocal operation of the pressure member 5 with simple structure when the back-torque limiting cam is operated.

Figure 6:
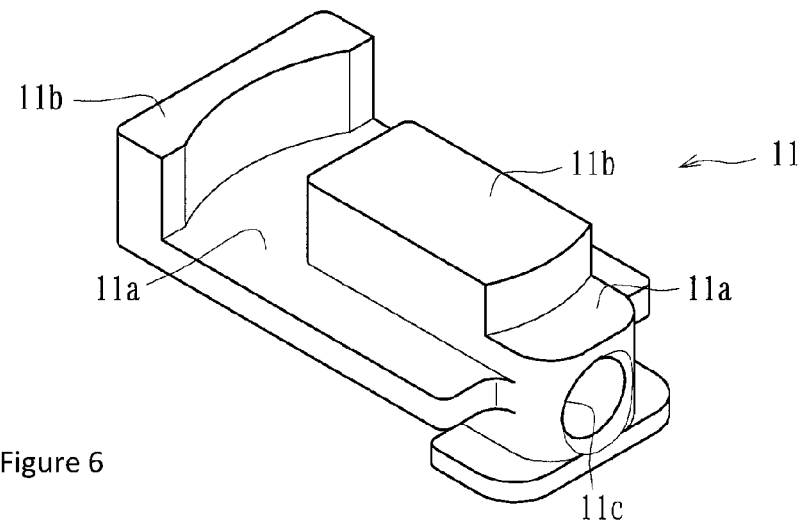
FIG. 6 is a perspective view showing a piece member (e.g., a switching device) of the power transmitting apparatus of FIG. 1.
Figure 7:
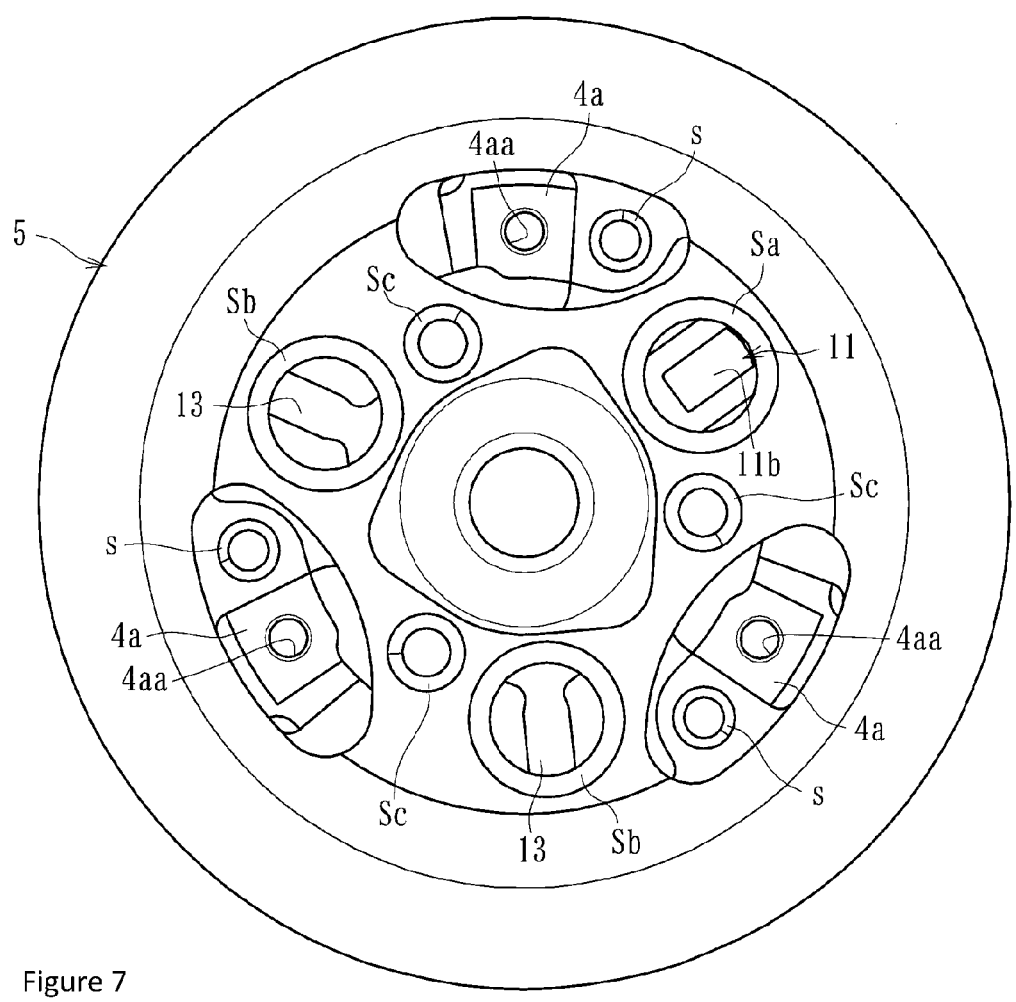
FIG. 7 is a plan view showing the power transmitting apparatus of FIG. 1 from which the supporting member (e.g., stay) is removed.
Figure 14:
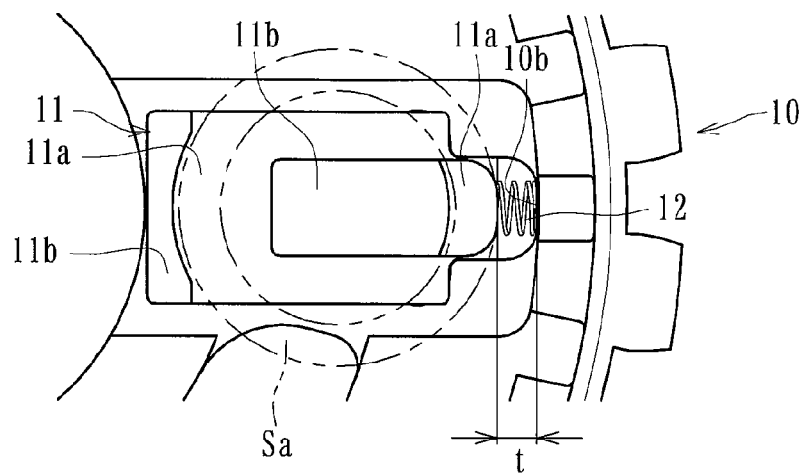
FIG. 14 is a plan view showing a condition of the piece member (e.g., switching device) in the urging force applying position of the power transmitting apparatus of FIG. 1.

The piece member 11 forming the switching device can be disposed on a surface of the intermediate member 10 facing the pressure member 5. As shown in FIG. 6, the piece member (e.g., switching device) 11 is formed of a part having recessed portions 11a, abutment portions 11b and a spring receiving bore 11c and adapted to be mounted within a mounting aperture 10a formed in the intermediate member 10. The piece member can be radially slidably therein by a distance t (e.g., see FIG. 14).

In some embodiments, the piece member (e.g., switching device) 11 can be switched between: (1) an urging force applying position (see, e.g., FIGS. 8 and 9) in which an abutment between the other end of the clutch spring (e.g., urging device) Sa and a securing portion 5b (see, e.g., FIGS. 8-11 and FIGS. 15 and 17) of the pressure member 5 is kept to apply the urging force of the clutch spring (e.g., urging device) Sa to the pressure member 5 when the intermediate member 10 is moved toward the pressure member 5 by the cam action of the back-torque limiting cam; and (2) an urging force cutting-off position (see, e.g., FIGS. 10 and 11) in which the other end of the clutch spring (e.g., urging device) Sa is separated from the securing portion 5b of the pressure member 5 to cut-off the urging force of the clutch spring Sa applied to the pressure member 5 when the intermediate member 10 is moved toward the pressure member 5 by the cam action of the back-torque limiting cam.

A coil spring 12 can be inserted into the spring receiving bore 11c and arranged so that the tip end of the coil spring 12 is abutted against an opening end 10b (see, e.g., FIG. 5) with the piece member 11 being mounted within the mounting aperture 10a of the intermediate member 10. Thus, the piece member 11 is normally kept in the urging force applying position while being urged by the coil spring 12 radially inward of the intermediate member 10. Any other urging device of general purpose may be used in place of the coil spring 12.

Figure 16:
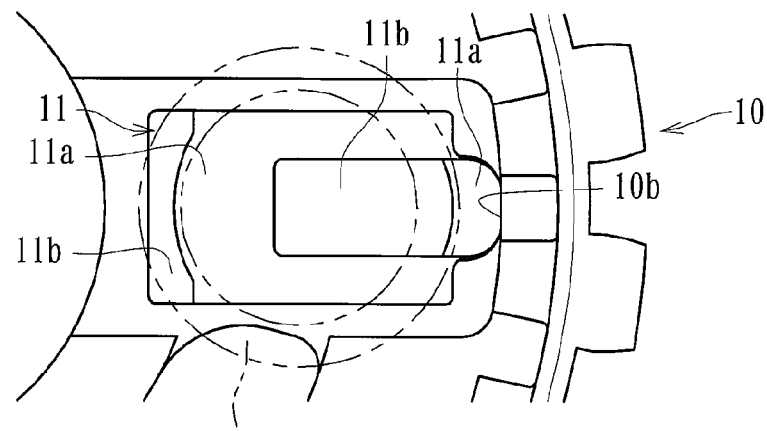
FIG. 16 is a plan view showing a condition of the piece member (e.g., switching device) in the urging force cutting-off position of the power transmitting apparatus of FIG. 1.

Although the piece member (e.g., switching device) 11 normally occupies the urging force applying position while being urged by the coil spring 12 to the urging force applying position, it can be adapted to be moved and switched to the urging force cutting-off position by a centrifugal force caused by rotation of the intermediate member 10 when the intermediate member 10 is rotated together with the clutch member 4 and the pressure member 5 during running of a vehicle. That is, the piece member 11 occupies the urging force applying position (see, e.g., FIG. 14) when a vehicle is stopped and the intermediate member 10 is also stopped, and the urging force cutting-off position (see, e.g., FIG. 16) when a vehicle is running and the intermediate member 10 is also rotated.

Figure 8:
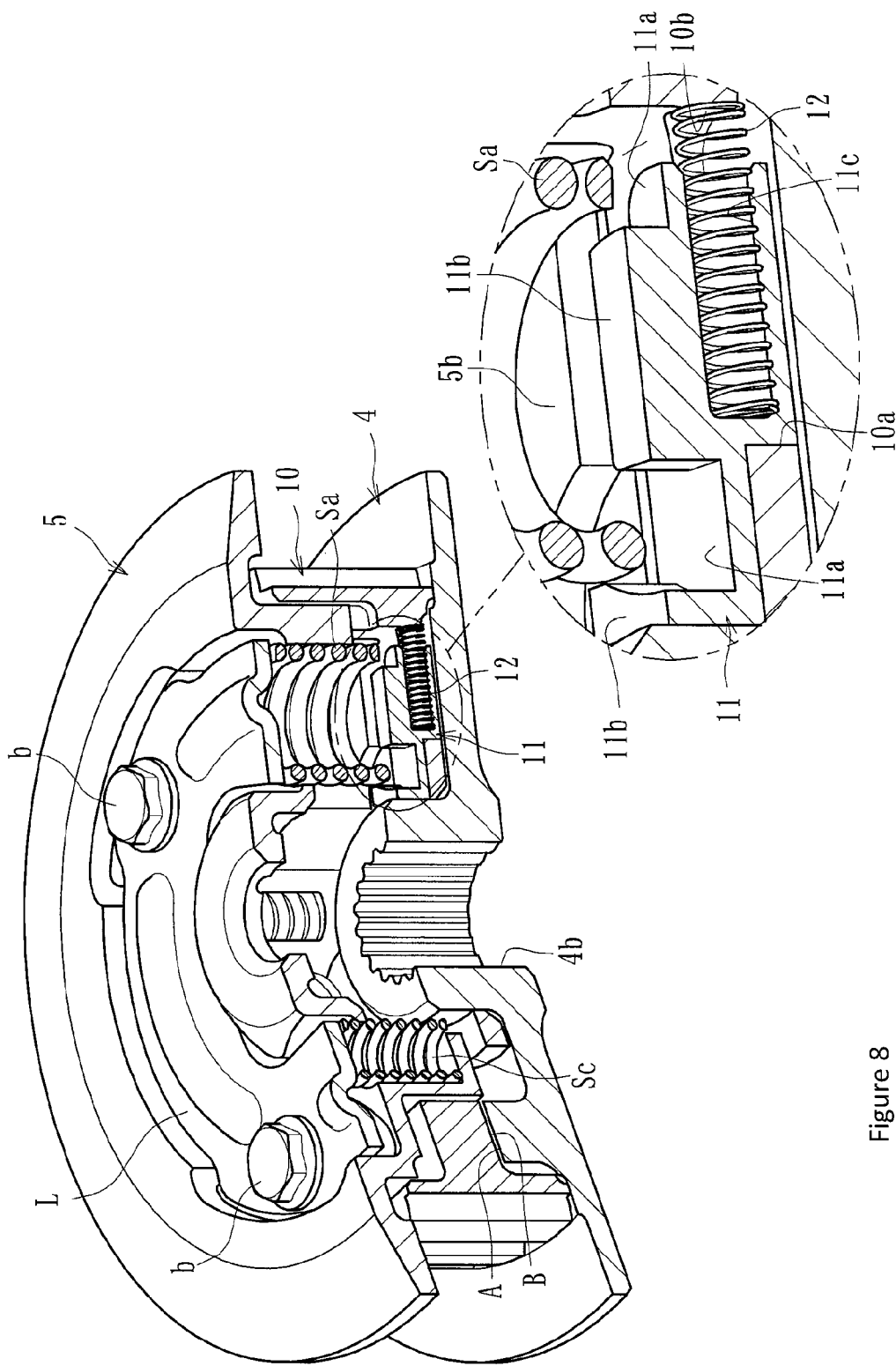
FIG. 8 is a longitudinal sectional perspective view showing an urging force applying position (e.g., a non-actuated position of a back-torque limiting cam device) of the piece member (e.g., switching device) of the power transmitting apparatus of FIG. 1.
Figure 9:
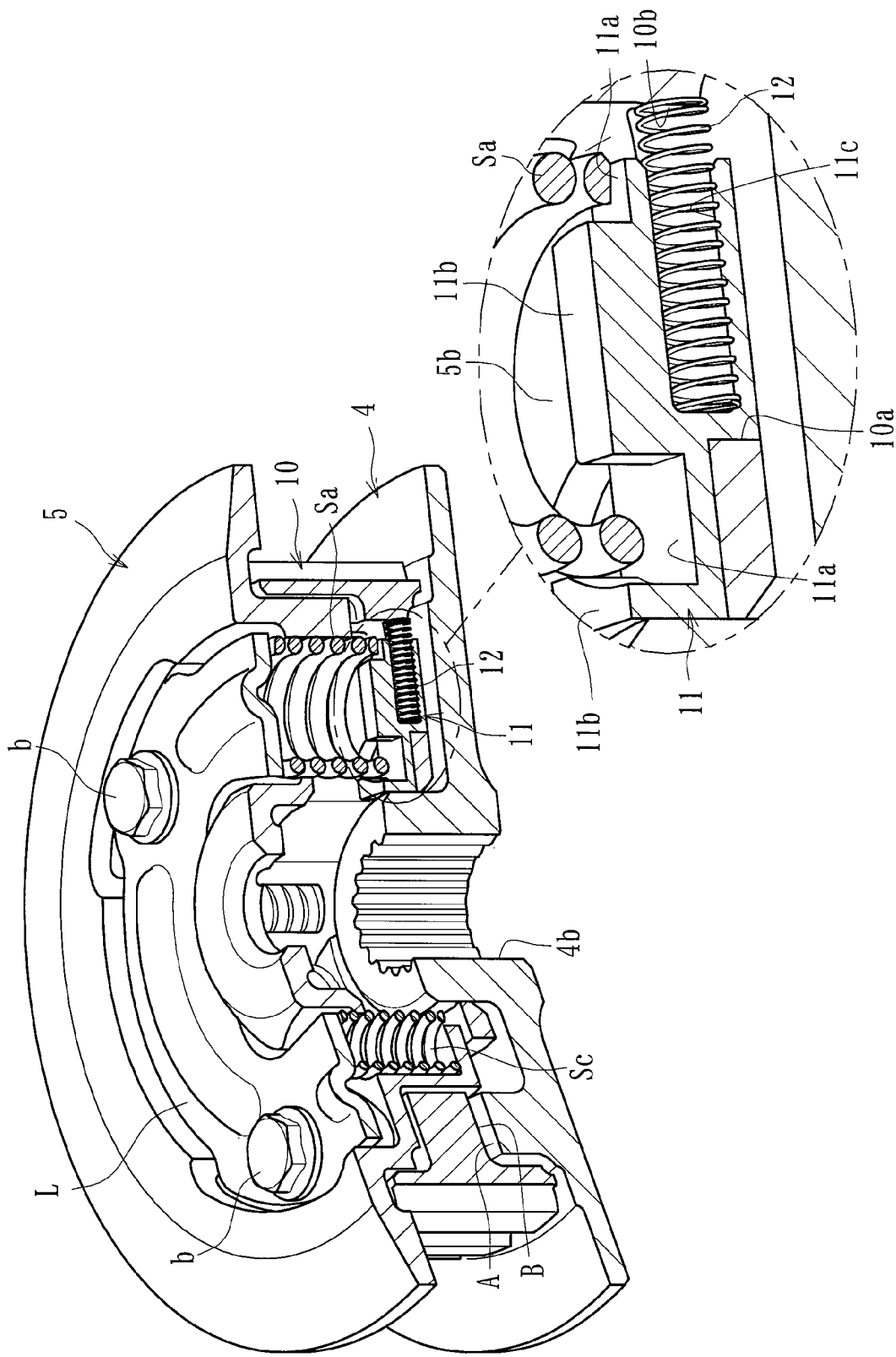
FIG. 9 is a longitudinal sectional perspective view showing an urging force applying position (e.g., an actuated position of a back-torque limiting cam device) of the piece member (e.g., switching device) of the power transmitting apparatus of FIG. 1.
Figure 15A:
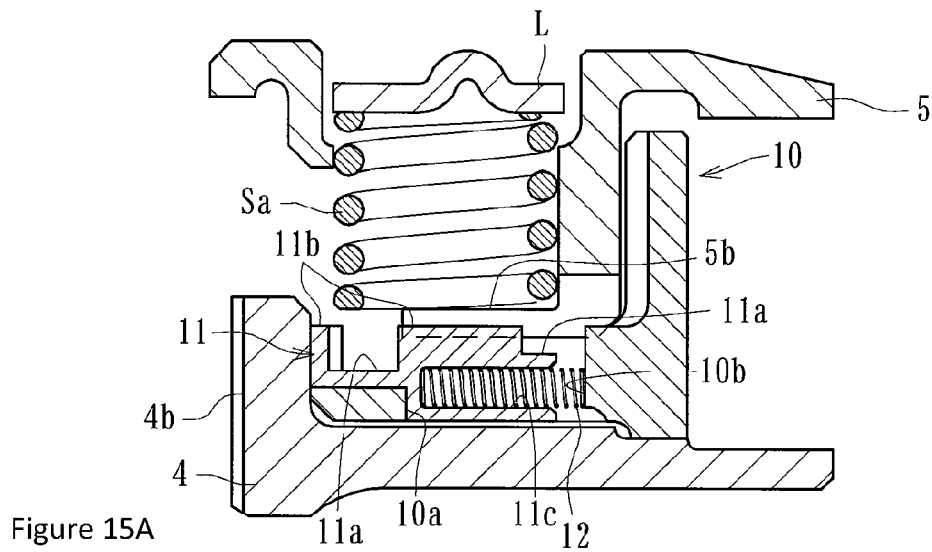
FIG. 15A is a longitudinal sectional schematic view showing an action of the piece member (e.g., switching device) in which the back-torque limiting cam is not actuated.
Figure 15B:
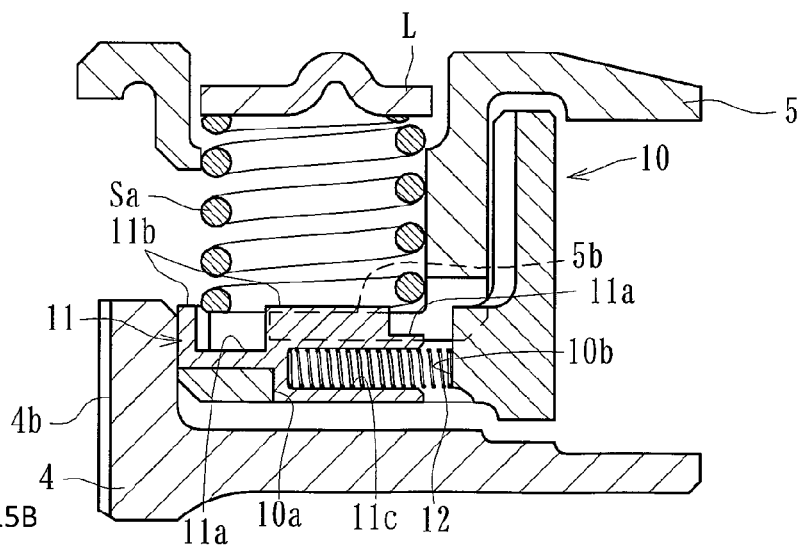
FIG. 15B is a longitudinal sectional schematic view showing an action of the piece member (e.g., switching device) in which the back-torque limiting cam is actuated.

The recessed portions 11a have a function of receiving the end of the clutch spring (e.g., urging device) Sa when the piece member 11 is in the urging force applying position as shown in FIGS. 8 and 9. That is, the piece member 11 occupies the urging force applying position as shown in FIGS. 8 and 15A when a vehicle and the intermediate member 10 are stopped. On the other hand, the end of the clutch spring (e.g., urging device) Sa is received in the recessed portion 11a due to correspondence of the end of the clutch spring Sa with the recessed portions 11a as shown in FIGS. 9 and 15B when the intermediate member 10 is moved toward the pressure member 5 by action of the back-torque limiting cam.

Since this prevents the clutch spring Sa from being pressed by the piece member 11, abutment of the other end of the clutch spring Sa against the securing portion 5b of the pressure member 5 can be kept and it is possible to apply the urging force of the clutch spring Sa to the pressure member 5. Thus, according to some embodiments the power transmitting apparatus is configured to transmit a torque necessary for performing the pushing start of engine and also to sufficiently resist the torque transmitted to the engine during pushing start of engine.

Figure 10:
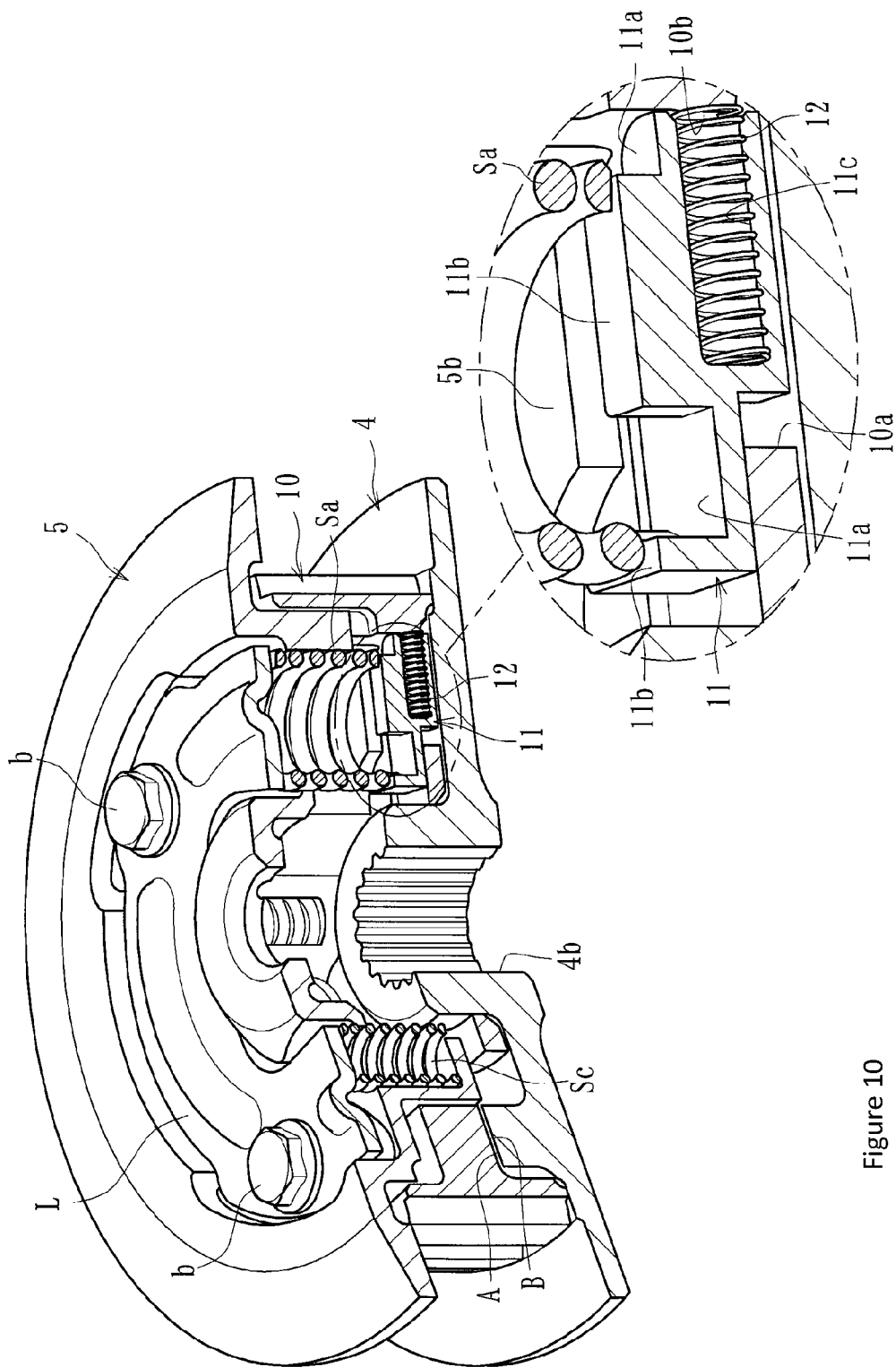
FIG. 10 is a longitudinal sectional perspective view showing an urging force cutting-off position (e.g., a non-actuated position of a back-torque limiting cam device) of the piece member (e.g., switching device) of the power transmitting apparatus of FIG. 1.
Figure 11:
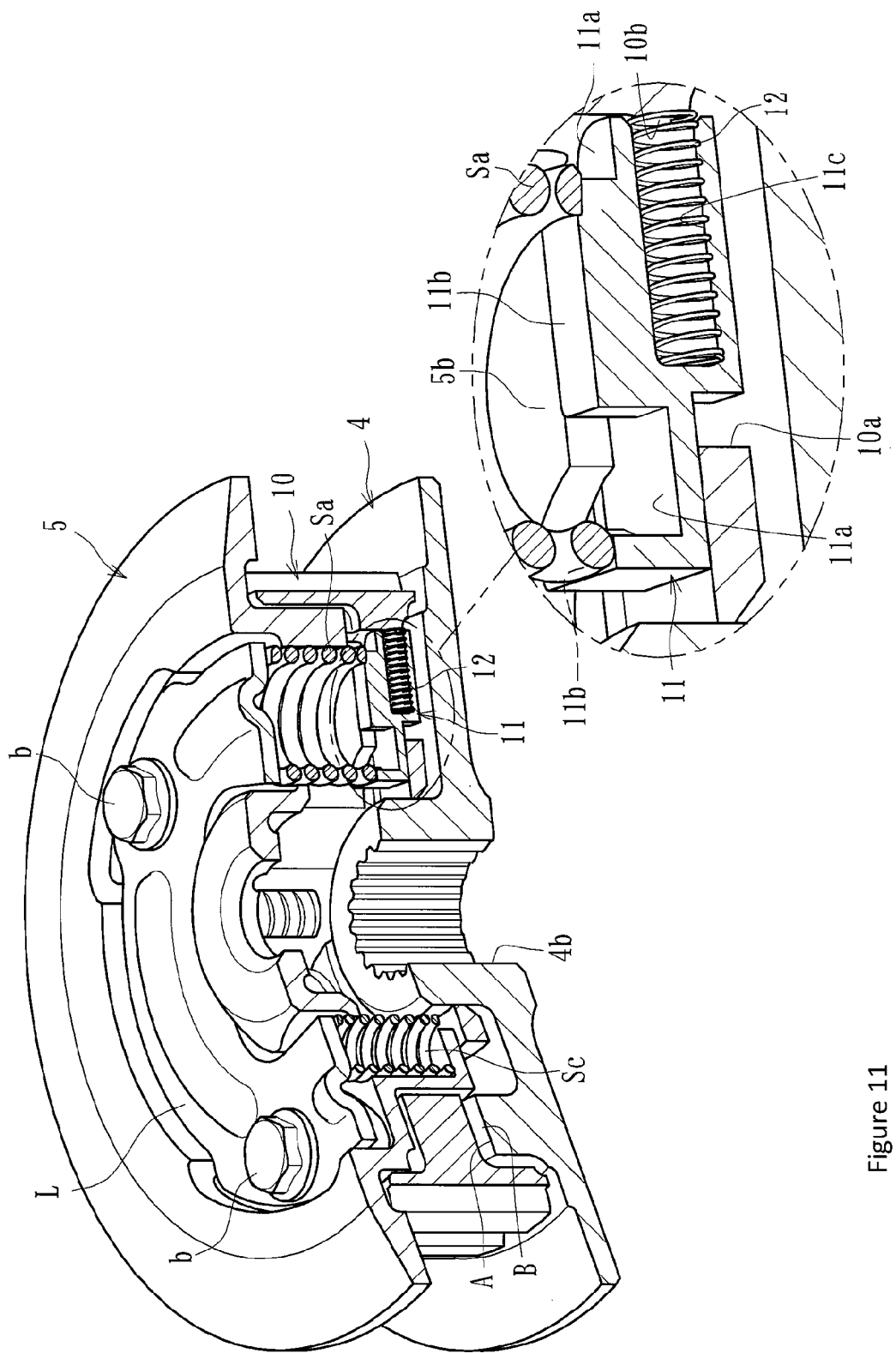
FIG. 11 is a longitudinal sectional perspective view showing an urging force cutting-off position (e.g., an actuated position of a back-torque limiting cam device) of the piece member (e.g., switching device) of the power transmitting apparatus of FIG. 1.
Figure 17A:
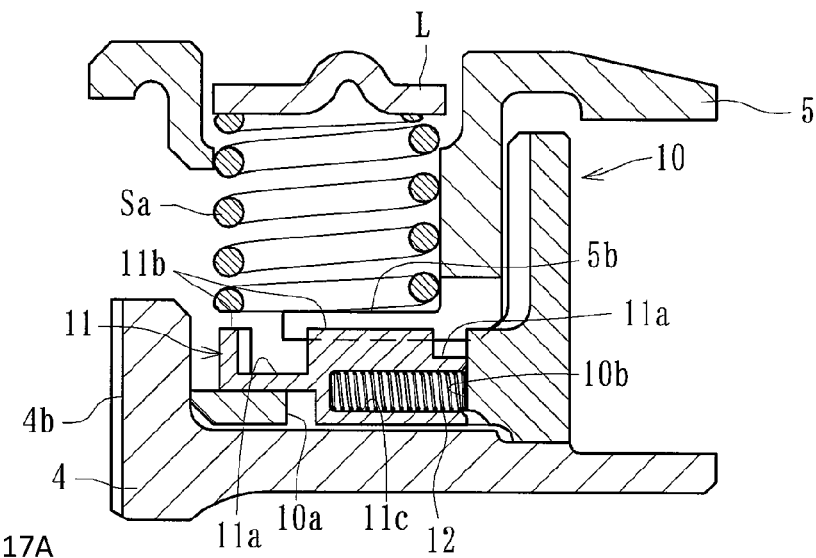
FIG. 17A is a longitudinal sectional schematic view showing an action of the piece member (e.g., switching device) in which the back-torque limiting cam is not actuated.
Figure 17B:
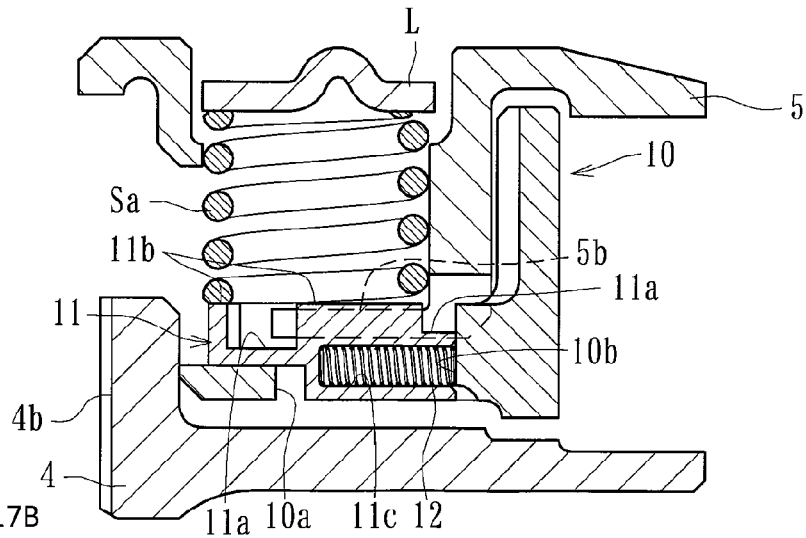
FIG. 17B is a longitudinal sectional schematic view showing an action of the piece member (e.g., switching device) in which the back-torque limiting cam is actuated.

As shown in FIGS. 10 and 11, the abutment portions 11b of the piece member 11 can be adapted to be contacted with the end of the clutch spring (e.g., urging device) Sa when the piece member 11 is in the urging force cutting-off position. That is, the piece member 11 can occupy the urging force cutting-off position as shown in FIGS. 10 and 17A when the intermediate member 10 is rotating during running of a vehicle and the abutment portions 11b can correspond to the end of the clutch spring Sa to press the end of the clutch spring Sa as shown in FIGS. 11 and 17B when the intermediate member 10 is moved toward the pressure member 5 by the action of the back-torque limiting cam.

Thus, since the other end of the clutch spring Sa is pressed by the piece member 11 and separated from the pressure member 5, it is possible to cut-off the urging force applied to the pressure member 5 from the clutch spring Sa. Accordingly, it is possible to release the press-contacting force between the driving-side clutch discs 6 and the driven-side clutch discs 7 due to axial movement of the intermediate member 10 caused by cam action of the clutch member-side cam surface A and the intermediate member-side cam surface b when the rotational speed of the shaft (e.g., output member) 3 exceeds that of the clutch housing (e.g., input member) 2 during running of a vehicle.

In a preferred embodiment of the present inventions, there are provided both the cutting-off devices 13 and the piece member (e.g., switching device) 11 and the piece member (e.g., switching device) 11 is arranged on any other urging device Sa (e.g., one clutch spring Sa in a preferred embodiment) except for the specific urging device Sb of the plurality of urging devices (e.g., clutch springs Sa, Sb) from which the urging force is cut-off by the cutting-off device 13.

According to the power transmitting apparatus of the present inventions, since the piece member (e.g., switching device) 11 which can be switched between the urging force applying position and the urging force cutting-off position and can occupy the urging force applying position when a vehicle is stopped and accordingly the intermediate member 10 is stopped and the urging force cutting-off position when a vehicle is running and the intermediate member 10 is rotated, it is possible to transmit a torque necessary for performing the pushing start of engine and also sufficiently resist against the torque to be transmitted to the engine during pushing start of engine.

According to the power transmitting apparatus of the present inventions, since the piece member (e.g., switching device) 11 is disposed on the intermediate member 10 in a normally urged condition toward the urging force applying position and adapted to be moved and switched to the urging force cutting-off position by a centrifugal force caused by rotation of the intermediate member 10, it is possible to simplify the structure of the power transmitting apparatus because of elimination of any other mechanism for performing switching operation of the switching device.

In some embodiments, since the switching device comprises a piece member 11 slidable between the urging force applying position and the urging force cutting-off position, and the piece member 11 has a surface formed with recessed portions 11a in which the end of the urging device Sa is fitted when the urging device Sa is in the urging force applying position and abutment portions 11b against which the end of the urging device Sa is abutted when the urging device Sa is in the urging force cutting-off position, it is possible to more smoothly transmit a necessary torque to an engine during the pushing start of the engine.

In some embodiments, since there are provided both the switching device 11 as well as the cutting-off device 13 for cutting-off an urging force applied to the pressure member 5 from the specific clutch springs (e.g., urging devices) Sb of the plurality of the urging devices Sa, Sb by separating the other end of the specific urging devices Sb from the pressure member 5 when the intermediate member 10 is moved toward the pressure member 5 by the cam action of the back-torque limiting cam A, B, and the switching device 11 is arranged on any other clutch spring (e.g., urging device) Sa other than the specific urging devices Sb of the plurality of the clutch springs (e.g., urging devices) Sa, Sb from which the urging force is cut-off by the cutting-off device 13, it is possible to arbitrarily adjust the torque to be transmitted to an engine during the pushing start of engine and to set a torque during the pushing start of engine in accordance with various kinds of vehicles.

Although preferable embodiments of the present inventions have been described, the present inventions are not limited to the illustrated embodiments. For example, other forms of switching devices may be used in place of the piece member 11 which can be switched between the urging force applying position and the urging force cutting-off position and can occupy the urging force applying position when a vehicle as well as the intermediate member are stopped and the urging force cutting-off position when a vehicle is running and the intermediate member 10 is rotated.

In addition, although it is described that the piece member 11 as a switching device is disposed on the intermediate member 10 under a normally urged condition toward the urging force applying position and adapted to be moved and switched to the urging force cutting-off position by a centrifugal force caused by rotation of the intermediate member 10, it is possible to adopt a piece member which can be set the urging force applying position by a urging device such as coil springs when a vehicle is stopped and set the urging force cutting-off position by a separate hydraulic cylinder or an actuator when a vehicle is running.

In addition, although it is described that the power transmitting apparatus comprises one piece member (e.g., switching device) 11 and two cutting-off devices 13, it may be possible to form the power transmitting apparatus comprising one cutting-off device 13, two piece member (e.g., switching devices) 11 or form the power transmitting apparatus comprising only one piece member 11 (e.g., one piece member 11 corresponding to both the clutch springs Sa, Sb.) The power transmitting apparatus of the present inventions can be applied to various kinds of multiple-disc type power transmitting apparatuses mounted on various vehicles equipped with pushing-start engines other than motorcycles.

The present inventions can be applied to any power transmitting apparatus although it has other different appearance or additional functions than those shown in the embodiments of the present invention if it is a power transmitting apparatus comprises a switching device for switching the urging device between an urging force applying position and an urging force cutting-off position: in the urging force applying position an abutment between the other end of the urging device and the pressure member is kept to apply the urging force of urging device to the pressure member when the intermediate member is moved toward the pressure member by the cam action of the back-torque limiting cam, and in the urging force cutting-off position the other end of the urging device is separated from the pressure member to cut-off the urging force of urging device to the pressure member when the intermediate member is moved toward the pressure member by the cam action of the back-torque limiting cam; and the urging device is set at the urging force applying position while the intermediate member is stopped when the vehicle is in a stopped condition and the urging device is set at the urging force cutting-off position while the intermediate member is rotated when the vehicle is in a running condition.

What is claimed is:

1. A power transmitting apparatus for transmitting or cutting-off the rotational driving power of an input member to or from an output member by press-contacting or releasing the press-contacting force between driving-side clutch discs and driven-side clutch discs comprising:
    a clutch housing rotatable together with the input member and mounted thereon a plurality of the driving-side clutch discs;
    a plurality of the driven-side clutch discs arranged between the driving-side clutch discs of the clutch housing alternately therewith;
    a clutch member connected to the output member;
    a pressure member mounted on the clutch member and axially movably relative to the clutch member so that the driving-side clutch discs and the driven-side clutch discs are forced to be press-contacted with each other when the pressure member approaches the clutch member and so that the press-contacting force acting on them is released when the pressure member moves away from the clutch member;
    an intermediate member spline-fitted with the driven-side clutch discs and arranged between the clutch member and the pressure member so as to be rotated together with the clutch member and the pressure member;
    a plurality of urging means, one end of each urging means being mounted on a supporting member secured on bosses projected from the clutch member and the other end of each urging means being mounted on the pressure member for normally urging the pressure member toward the intermediate member and the clutch member in order to press-contact the driving-side clutch discs and the driven-side clutch discs with each other; and
    a back-torque limiting cam means comprising a clutch member-side cam surface formed on the clutch member and an intermediate member-side cam surface formed on the intermediate member for performing a cam action so that the intermediate member is axially moved to release the press-contacting force acting on the driving-side clutch discs and the driven-side clutch discs when the rotational speed of the output member exceeds the rotational speed of the input member and a relative rotation is caused between the intermediate member and the clutch member;
    wherein the power transmitting apparatus further comprises a switching means for switching the urging means between an urging force applying position and an urging force cutting-off position;
    wherein, in the urging force applying position, an abutment between the other end of the urging means and the pressure member is maintained to apply the urging force of the urging means to the pressure member when the intermediate member is moved toward the pressure member by the cam action of the back-torque limiting cam means, and wherein, in the urging force cutting-off position, the other end of the urging means is separated from the pressure member to cut-off the urging force of the urging means to the pressure member when the intermediate member is moved toward the pressure member by the cam action of the back-torque limiting cam means; and
    wherein the urging means is set to the urging force applying position while the intermediate member is stopped when the vehicle is in a stopped condition and the urging means is set to the urging force cutting-off position while the intermediate member is rotated when the vehicle is in a running condition.

2. The power transmitting apparatus of claim 1 wherein the switching means is disposed on the intermediate member and is normally urged toward the urging force applying position and is adapted to be moved and switched to the urging force cutting-off position by a centrifugal force caused by rotation of the intermediate member.

3. The power transmitting apparatus of claim 1 wherein the switching means comprises a piece member slidable between the urging force applying position and the urging force cutting-off position, and wherein a surface of the piece member is formed with recessed portions in which the end of the urging means is fitted when the urging means is in the urging force applying position and abutment portions against which the end of the urging means is abutted when the urging means is in the urging force cutting-off position.

4. The power transmitting apparatus of claim 2 wherein the switching means comprises a piece member slidable between the urging force applying position and the urging force cutting-off position, and wherein a surface of the piece member is formed with recessed portions in which the end of the urging means is fitted when the urging means is in the urging force applying position and abutment portions against which the end of the urging means is abutted when the urging means is in the urging force cutting-off position.

5. The power transmitting apparatus of claim 1 provided with both the switching means as well as a cutting-off means for cutting-off an urging force applied to the pressure member from a specific urging means of the plurality of the urging means by separating the other end of the specific urging means from the pressure member when the intermediate member is moved toward the pressure member by the cam action of the back-torque limiting cam means, and wherein the switching means is arranged on any other urging means except for the specific urging means of the plurality of the urging means from which the urging force is cut-off by the cutting-off means.

6. The power transmitting apparatus of claim 2 provided with both the switching means as well as a cutting-off means for cutting-off an urging force applied to the pressure member from a specific urging means of the plurality of the urging means by separating the other end of the specific urging means from the pressure member when the intermediate member is moved toward the pressure member by the cam action of the back-torque limiting cam means, and wherein the switching means is arranged on any other urging means except for the specific urging means of the plurality of the urging means from which the urging force is cut-off by the cutting-off means.

7. The power transmitting apparatus of claim 3 provided with both the switching means as well as a cutting-off means for cutting-off an urging force applied to the pressure member from a specific urging means of the plurality of the urging means by separating the other end of the specific urging means from the pressure member when the intermediate member is moved toward the pressure member by the cam action of the back-torque limiting cam means, and wherein the switching means is arranged on any other urging means except for the specific urging means of the plurality of the urging means from which the urging force is cut-off by the cutting-off means.

8. The power transmitting apparatus of claim 4 provided with both the switching means as well as a cutting-off means for cutting-off an urging force applied to the pressure member from a specific urging means of the plurality of the urging means by separating the other end of the specific urging means from the pressure member when the intermediate member is moved toward the pressure member by the cam action of the back-torque limiting cam means, and wherein the switching means is arranged on any other urging means except for the specific urging means of the plurality of the urging means from which the urging force is cut-off by the cutting-off means.

9. A power transmitting apparatus for transmitting or cutting-off the rotational driving power of an input member to or from an output member by press-contacting or releasing the press-contacting force between driving-side clutch discs and driven-side clutch discs comprising:

a clutch housing rotatable together with the input member and mounted thereon a plurality of the driving-side clutch discs;

a plurality of the driven-side clutch discs arranged between the driving-side clutch discs of the clutch housing alternately therewith;

a clutch member connected to the output member;

a pressure member mounted on the clutch member and axially movably relative to the clutch member so that the driving-side clutch discs and the driven-side clutch discs are forced to be press-contacted with each other when the pressure member approaches the clutch member and so that the press-contacting force acting on them is released when the pressure member moves away from the clutch member;

an intermediate member spline-fitted with the driven-side clutch discs and arranged between the clutch member and the pressure member so as to be rotated together with the clutch member and the pressure member;

a plurality of springs, one end of each spring being mounted on a supporting member secured on bosses projected from the clutch member and the other end of each spring being mounted on the pressure member for normally urging the pressure member toward the intermediate member and the clutch member in order to press-contact the driving-side clutch discs and the driven-side clutch discs with each other; and a back-torque limiting cam comprising a clutch member-side cam surface formed on the clutch member and an intermediate member-side cam surface formed on the intermediate member for performing a cam action so that the intermediate member is axially moved to release the press-contacting force acting on the driving-side clutch discs and the driven-side clutch discs when the rotational speed of the output member exceeds the rotational speed of the input member and a relative rotation is caused between the intermediate member and the clutch member;

wherein the power transmitting apparatus further comprises a switching device part having recessed portions and abutment portions and configured to switch at least one of the springs between an urging force applying position and an urging force cutting-off position;

wherein, in the urging force applying position, an abutment between the other end of the at least one spring and the pressure member is maintained to apply the urging force of the at least one spring to the pressure member when the intermediate member is moved toward the pressure member by the cam action of the back-torque limiting cam, and wherein, in the urging force cutting-off position, the other end of the at least one spring is separated from the pressure member to cut-off the urging force of the at least one spring to the pressure member when the intermediate member is moved toward the pressure member by the cam action of the back-torque limiting cam; and wherein the at least one spring is set to the urging force applying position while the intermediate member is stopped when the vehicle is in a stopped condition and the at least one spring is set to the urging force cutting-off position while the intermediate member is rotated when the vehicle is in a running condition.

10. The power transmitting apparatus of claim 9 wherein the switching device is disposed on the intermediate member and is normally urged toward the urging force applying position and is adapted to be moved and switched to the urging force cutting-off position by a centrifugal force caused by rotation of the intermediate member.

11. The power transmitting apparatus of claim 9 wherein the switching device comprises a piece member slidable between the urging force applying position and the urging force cutting-off position, and wherein a surface of the piece member is formed with recessed portions in which the end of the at least one spring is fitted when the at least one spring is in the urging force applying position and abutment portions against which the end of the at least one spring is abutted when the at least one spring is in the urging force cutting-off position.

12. The power transmitting apparatus of claim 10 wherein the switching device comprises a piece member slidable between the urging force applying position and the urging force cutting-off position, and wherein a surface of the piece member is formed with recessed portions in which the end of the at least one spring is fitted when the at least one spring is in the urging force applying position and abutment portions against which the end of the at least one spring is abutted when the at least one spring is in the urging force cutting-off position.

13. The power transmitting apparatus of claim 9 provided with both the switching device as well as a cutting-off device having a ribbed portion and configured to cut-off an urging force applied to the pressure member from a specific spring of the plurality of the springs by separating the other end of the specific spring from the pressure member when the intermediate member is moved toward the pressure member by the cam action of the back-torque limiting cam, and wherein the switching device is arranged on any other spring except for the specific spring of the plurality of the springs from which the urging force is cut-off by the ribbed portion.

14. The power transmitting apparatus of claim 10 provided with both the switching device as well as a cutting-off device having a ribbed portion and configured to cut-off an urging force applied to the pressure member from a specific spring of the plurality of the springs by separating the other end of the specific spring from the pressure member when the intermediate member is moved toward the pressure member by the cam action of the back-torque limiting cam, and wherein the switching device is arranged on any other spring except for the specific spring of the plurality of the springs from which the urging force is cut-off by the ribbed portion.

15. The power transmitting apparatus of claim 11 provided with both the switching device as well as a cutting-off device having a ribbed portion and configured to cut-off an urging force applied to the pressure member from a specific spring of the plurality of the springs by separating the other end of the specific spring from the pressure member when the intermediate member is moved toward the pressure member by the cam action of the back-torque limiting cam, and wherein the switching device is arranged on any other spring except for the specific spring of the plurality of the springs from which the urging force is cut-off by the ribbed portion.

16. The power transmitting apparatus of claim 12 provided with both the switching device as well as a cutting-off device having a ribbed portion and configured to cut-off an urging force applied to the pressure member from a specific spring of the plurality of the springs by separating the other end of the specific spring from the pressure member when the intermediate member is moved toward the pressure member by the cam action of the back-torque limiting cam, and wherein the switching device is arranged on any other spring except for the specific spring of the plurality of the springs from which the urging force is cut-off by the ribbed portion cutting off device.

* * * * *